United States Patent [19]

Banno et al.

[11] Patent Number: 5,686,377
[45] Date of Patent: Nov. 11, 1997

[54] CATALYST FOR PURIFYING EXHAUST GASES

[75] Inventors: Kouji Banno, Nagoya; Masahiro Sugiura, Aichi-ken; Yoko Kumai, Nagaoya; Haruo Doi; Tetsuo Nagami, both of Nagoya; Norihiko Aono, Shizuoka-ken; Koichi Kasahara, Shizuoka-ken; Shigeji Matsumoto, Shizuoka-ken, all of Japan

[73] Assignees: Kabushiki Kaisha Toyota Chuo Kenkyusho, Aichi-ken; Toyota Jidosha Kabushiki Kaisha, Toyota; Cataler Industrial Co., Ltd., Shizuoka-ken, all of Japan

[21] Appl. No.: 586,281

[22] Filed: Jan. 16, 1996

[30] Foreign Application Priority Data

Jan. 17, 1995 [JP] Japan ................... 7-005112
Dec. 19, 1995 [JP] Japan ................... 7-330660
Dec. 28, 1995 [JP] Japan ................... 7-342726

[51] Int. Cl.$^6$ .............. B01J 23/58; B01J 23/42; B01J 23/04; B01J 23/44
[52] U.S. Cl. ............ 502/330; 502/339; 502/344; 502/350
[58] Field of Search ............... 502/330, 339, 502/344, 350

[56] References Cited

U.S. PATENT DOCUMENTS

| | | | |
|---|---|---|---|
| 4,048,098 | 9/1977 | Koberstein et al. | 502/177 |
| 4,769,356 | 9/1988 | Takeuchi et al. | 502/242 |
| 4,849,399 | 7/1989 | Joy, III et al. | 502/333 |
| 4,910,180 | 3/1990 | Berndt et al. | 502/304 |

FOREIGN PATENT DOCUMENTS

| | | |
|---|---|---|
| 0 315 896 | 5/1989 | European Pat. Off. . |
| 0 494 591 | 7/1992 | European Pat. Off. . |
| 52-29487 | 3/1977 | Japan . |
| 61-54238 | 3/1986 | Japan . |
| 3-38255 | 6/1991 | Japan . |
| 4-87627 | 3/1992 | Japan . |
| 5-58775 | 8/1993 | Japan . |
| 6-16854 | 3/1994 | Japan . |
| 7-71634 | 8/1995 | Japan . |
| WO 93/22050 | 11/1993 | WIPO . |

OTHER PUBLICATIONS

Patent Abstracts of Japan, vol. 10, No. 214 (C–362), Jul. 25, 1986, JP-A-61 054238, Mar. 18, 1986.
Patent Abstracts of Japan, vol. 13, No. 179 (C–590), Apr. 26, 1989, JP-A-01 007951, Jan. 11, 1989.
Database WPI, Derwent Publications, An-90-055381 [08], JP-A-02 009452, Jan. 12, 1990.
Database WPI, Derwent Publications, AN-90-280145 [37], JP-A-02 198632, Aug. 7, 1990.
Database WPI, Derwent Publications, AN-90-287630 [38], JP-A-02 203938, Aug. 13, 1990.

*Primary Examiner*—Glenn A. Caldarola
*Assistant Examiner*—Thuan D. Dang
*Attorney, Agent, or Firm*—Oblon, Spivak, McClelland, Maier & Neustadt, P.C.

[57] ABSTRACT

A catalyst for purifying exhaust gases comprises a catalyst carrier made of potassium titanate and a noble metal loaded on the catalyst carrier. The catalyst carrier is substantially free from alumina. This catalyst can oxidize at least hydrocarbons in exhaust gases at a high catalytic activity even at low temperatures, and at the same time can suppress $SO_2$ from converting into sulfates. This catalyst does not employ substance like alumina exhibiting solid acidity as a catalyst carrier. Further, this catalyst can be used for purifying exhaust gases from diesel engines to suppress particulates and sulfates from being emitted, and to improve conversions of hydrocarbons and carbon monoxide.

8 Claims, No Drawings

CATALYST FOR PURIFYING EXHAUST GASES

BACKGROUND OF THE INVENTION

1. Field of the Invention

This invention relates to a catalyst for purifying exhaust gases which can suppress the oxidation of sulfur dioxide ($SO_2$) contained in combustion exhaust gases from automotive internal combustion engines, boilers and the like, and oxidize and remove hydrocarbons (HC) and carbon monoxide (CO) contained in the exhaust gases. This invention also relates to a trap or an open type (straight flow) catalyst for removing carbon monoxide (CO), hydrocarbons (HC), and soluble organic fractions (SOF) in exhaust gases from a diesel engine.

2. Description of the Related Art

A catalyst disclosed in Japanese Unexamined Patent Publication (KOKAI) No.52-29,487 and comprising a porous catalyst carrier such as alumina and a noble metal such as platinum loaded on the catalyst carrier has generally been known as an oxidation catalyst. In this type of oxidation catalyst, the solid acidity and the large BET surface area of the porous catalyst carrier have been considered. The oxidation performance of this type of catalyst, however, is not sufficient. A catalyst which can exhibit high catalytic performance even at low temperatures has been in demand for the practical use as a catalyst for purifying automotive exhaust gases.

In the meanwhile, the inventors of the present invention et al filed a patent application directed to an oxidation catalyst for oxidizing hydrocarbons (HC) and carbon monoxide (CO) in exhaust gases which is prepared by heat treating clay mineral having a double-chain structure in the temperature range from 400° C. to 800° C. to make at least a part of the clay mineral amorphous; exchanging magnesium ions and/or aluminum ions of the clay mineral with iron ions; and loading platinum and/or palladium in the clay mineral (Japanese Unexamined Patent Publication (KOKAI) No.4-363,138). This oxidation catalyst attains improved catalytic activity of converting 50% of hydrocarbons in a lower temperature range from 100° C. to 200° C.

Further, Japanese Unexamined Patent Publication (KOKAI) No.61-54,238 discloses a catalyst for purifying exhaust gases which comprises a catalyst carrier including lime aluminate and fibrous potassium titanate and at least one catalyst ingredient selected from the group consisting of platinum group elements and rare-earth elements loaded on the catalyst carrier.

This catalyst for purifying exhaust gases includes 0.5 to 50% by weight of fibrous potassium titanate as a melt inhibitor for stabilizing lime aluminate at elevated temperatures from 900° C. to 1,000° C. The publication describes that this catalyst is effective in purifying carbon monoxide and nitrogen oxides.

As to gasoline engines, combustion engines, development of techniques for meeting severe regulations of exhaust gases has decreased harmful components in the exhaust gases. In the field of diesel engines, however, because of the fact that harmful components are exhausted mainly in the form of particulates, the regulations and development of techniques for decreasing toxic substances in exhaust gases are behind those for gasoline engines. It has been desired to develop an apparatus which can securely purify exhaust gases from a diesel engine.

Apparatus for purifying exhaust gases from diesel engines which have been developed so far employ a trap (with or without a catalyst) or an open type SOF decomposing catalyst.

The apparatus employing a trap without a catalyst serve to suppress the exhaust of particulates contained in exhaust gases from a diesel engine by trapping the particulates. These apparatus have a problem that a trap cracks or the like because heating is generally required at the time of regenerating the trap by burning off trapped SOFs as particulates and dry soot.

The apparatus employing a trap with a catalyst serve to purify not only carbon monoxide and hydrocarbons but also particulates contained in exhaust gases from a diesel engine. For example, Japanese Examined Patent Publication (KOKOKAI) No.5-58775 discloses a catalyst for purifying exhaust gases on which at least one selected from the group consisting of palladium, praseodymium, neodymium, and samarium is loaded. The pores of the trap with a catalyst may be dogged depending on the kinds of catalysts to be loaded when used for a long time, and there may arise a problem that the purifying efficiency is decreased.

On the other hand in, open type SOF decomposing catalysts disclosed in Japanese Examined Patent Publication (KOKAI) No.3-38255, an oxidation catalyst ingredient such as a platinum group element is loaded on a catalyst carrier layer such as activated alumina in the same way as in a catalyst for purifying exhaust gases from a gasoline engine. Therefore, soluble organic fractions in the particulates as well as carbon monoxide and hydrocarbons are purified by oxidation. Although these open type SOF decomposing catalysts have a fault that the removal of dry soot is insufficient, these catalysts are under research and development because the amount of dry soot will be reduced by improving diesel engines and fuel itself, and because these catalysts have a merit of requiring no apparatus for regenerating traps.

Although the above oxidation catalyst in which at least one of platinum group elements and rare-earth elements is loaded on a catalyst carrier including lime aluminate and fibrous potassium titanate can purify carbon monoxide and nitrogen oxides, there arises a problem that when sulfur dioxide ($SO_2$) is contained in exhaust gases, the catalyst oxidizes the sulfur dioxide to anhydrous sulfuric acid and forms sulfates. When $SO_2$ is oxidized and emitted to the atmosphere in the form of $SO_3$, the $SO_3$ causes a problem that the $SO_3$ reacts with $H_2O$ contained in the atmosphere to form sulfuric acid ($H_2SO_4$). On the other hand, when $SO_2$ is emitted as it is, namely, in the form of $SO_2$, the $SO_2$ reacts with $O_3$ contained in the atmosphere to form $SO_3$, but it takes time to change $SO_2$ to $SO_3$, because the chance of reaction of $SO_2$ with $O_3$ is little in the atmosphere. So, the emission of $SO_2$ to the atmosphere causes a less severe problem as compared with emission of $SO_3$ to the atmosphere. Therefore, it is desired to reduce the emission of $SO_3$ into the atmosphere as much as possible.

In the oxidation of $SO_2$, an alumina component such as lime aluminate enhances the noble metal catalytic activity of oxidizing $SO_2$ to form $SO_3$ and $H_2SO_4$ in accordance with the reactions:

$$SO_2 + (\tfrac{1}{2})O_2 \rightarrow SO_3 \quad (1)$$

$$SO_3 + H_2O \rightarrow H_2SO_4 \quad (2)$$

The generation of $SO_3$ and $H2SO_4$ is not preferable.

Further, the above oxidation catalyst in which at least one of platinum group elements and rare-earth elements is loaded on a catalyst carrier including lime aluminate and fibrous potassium titanate does not give sufficient catalyst performance at low exhaust gas temperatures.

By the way, conventional catalysts for purifying exhaust gases from diesel engines are ineffective in reducing the exhaust amount of particulates. That is to say, since an activated alumina layer used in the conventional catalysts has a property of adsorbing $SO_2$, $SO_2$ contained in the exhaust gases from diesel engines is adsorbed by the activated alumina layer, and when the catalyst temperature is elevated, the adsorbed $SO_2$ is oxidized by the catalytic action of a catalyst metal. Therefore, $SO_2$ is emitted in the form of $SO_3$, and causes a problem that the amount of particulates of $SO_3$, increases. The exhaust gases, especially from diesel engines contain sufficient oxygen gas, and accordingly, the reaction of oxidizing $SO_2$ is liable to occur. The resulting $SO_3$ easily reacts with water vapor, which exists in the exhaust gases in a large amount, to form sulfuric acid mist.

SUMMARY OF THE INVENTION

It is an object of the present invention to provide a catalyst for purifying exhaust gases which can oxidize at least hydrocarbons and carbon monoxide contained in the exhaust gases at a high catalytic activity at low temperatures, and at the same time which can suppress sulfur dioxide from converting into sulfuric acid.

It is a further object of the present invention to provide a catalyst particularly suitable for purifying exhaust gases from a diesel engine.

A catalyst for purifying exhaust gases comprises a catalyst carrier comprising potassium titanate expressed by the chemical formula $K_2O \cdot nTiO_2$ wherein n is an integer selected from 4 to 8, the catalyst carrier being substantially free from alumina, and a noble metal loaded on the catalyst carrier.

A catalyst for purifying exhaust gases comprises a catalyst support and a heat-resistant inorganic oxide layer formed on the catalyst support. And the heat-resistant inorganic oxide layer comprising potassium titanate expressed by the chemical formula $K_2O \cdot nTiO_2$ wherein n is an integer selected from 4 to 8 and at least one selected from the group consisting of silica, titania and zirconia, and loading a noble metal therein. The heat-resistant inorganic oxide layer is substantially free from alumina.

Potassium titanate is a composite compound of $K_2O$ and $TiO_2$. When n is less than 4, $K_2O$ is liable to be dissolved into an acid solution. This narrows the variation of a solutions for loading a noble metal in preparing a catalyst. So, the n range of less than 4 is not preferable.

Further, when n is less than 2, potassium titanate cannot have a crystal structure with regularity, but adsorbs and loads potassium (K) on its surface. So, when n is less than 2, potassium is eluted by water or the like contained in exhaust gases, and as a result desirable catalytic activity cannot be maintained. Further, a noble metal catalyst ingredient such as platinum is covered with the eluted excessive potassium, which results in a further decrease in catalytic activity.

On the other hand, when n is more than 8, the effect of potassium on the suppression of sulfuric acid generation is insufficient, and the catalytic activity for purifying exhaust gases is also insufficient. So, the n range of more than 8 is not preferable. Accordingly, when potassium titanate is expressed by the chemical formula: $K_2O \cdot nTiO_2$, n is preferably from 4 to 8.

Potassium titanate is formed by a solid phase reaction of potassium oxide ($K_2O$) and titanium dioxide ($TiO_2$), and potassium exists in a stable state there in the present composition.

When a catalyst carrier is prepared by simply loading $K_2O$ on $TiO_2$ instead of employing potassium titanate, $K_2O$ is easily eluted by the presence of water in exhaust gases, and the effect of loading $K_2O$ is drastically decreased. Further, when catalyst carriers are prepared by loading potassium on other catalyst carriers such as $SiO_2$ and $Al_2O_3$, potassium is eluted by the presence of water or the like in exhaust gases, and the effect of providing potassium cannot be exerted. Further, when potassium is loaded on $SiO_2$, the eluted potassium unfavorably reacts with $SiO_2$ into a vitreous state at elevated temperatures.

Preferably, the catalyst carrier according to the first aspect of the present invention is formed only of potassium titanate. In other words, it is preferable to employ potassium titanate in the form of powder or porous pellets. It must be noted that a binder can be used to shape potassium titanate. Examples of suitable binders include a silica-based material, a titania-based material, a zirconia-based material and a ceria-based material.

As mentioned above, alumina is not preferable as a component of the catalyst carrier, because alumina oxidizes $SO_2$ to form $SO_3$ and $H_2SO_4$. For this reason, the catalyst according to the first aspect of the present invention is substantially free from alumina. The term 'substantially' means that a catalyst including alumina as, for example, impurities is not excluded.

The catalyst ingredient loaded on the catalyst carrier comprising potassium titanate according to the present invention is preferably a noble metal, particularly one of the platinum group elements of platinum (Pt), palladium (Pd) and rhodium (Rh). Of these noble metal catalyst ingredients, platinum is most desirable, because platinum has a high ability of decomposing hydrocarbons (HC), and because even when a small amount of $K_2O$ is eluted from potassium titanate, the elution gives little harmful effect on that ability of decomposing hydrocarbons.

The loading amount of the platinum group element is preferably from 0.2 to 10 g based on 100 g of potassium titanate. When the loading amount is less than 0.2 g, the catalyst performance is not sufficient. On the other hand, when the loading amount is more than 10 g, not only the catalysis is degraded due to metal aggregation, but also the production costs of the catalyst are increased. So, the loading amount of more than 10 g is not preferable.

In the catalyst for purifying exhaust gases according to the second aspect of the present invention, the heat-resistant inorganic oxide layer is substantially free from alumina and comprises potassium titanate and at least one of silica, titania, and zirconia. Silica, titania, and zirconia used for the heat-resistant inorganic oxide layer are preferably in the form of powder and/or sol. Although either of powder and sol is good enough, a mixture of powder and sol is desirable. The particle size of the inorganic oxides is preferably 60 microns or less. When the inorganic oxides are more than 60 microns, the catalysts in which at least one catalyst ingredient of platinum, palladium and rhodium is loaded on these inorganic oxides cannot exhibit sufficient catalytic activity.

By giving the above construction to the heat-resistant inorganic oxide layer, the catalyst can suppress sulfates from being emitted, and at the same time can improve the conversions of hydrocarbons and carbon monoxide in a low temperature range.

The loading amount of potassium titanate in the heat-resistant inorganic oxide layer is preferably 20 to 60 g per liter of the catalyst. When the loading amount of potassium titanate is less than 20 g/liter, sufficient catalytic activity may not be obtained. On the other hand, when the loading amount of potassium titanate is more than 60 g/liter, the more increase in the loading amount of potassium titanate does not improve the catalytic activity so much but unfavorably increases the production cost. The loading amount in the range from 30 to 40 g/liter is particularly more preferable in respect of catalytic activity and costs.

The coating amount of one or more selected from the group consisting of silica, titania, and zirconia constituting the heat-resistant inorganic oxide layer on the support is preferably 40 to 80 g per liter of the catalyst. When this coating amount is less than 40 g/liter, sufficient catalytic activity may not be obtained. On the other hand, when the coating amount exceeds 80 g/liter, the more increase in the coating amount does not improve catalytic activity the more, but increases the production cost. The coating amount in the range from 60 to 70 g/liter is more preferable in respect of catalytic activity and production cost.

The heat-resistant inorganic oxide layer may include zeolite. When zeolite is included, it is preferable that the ratio of silica to alumina is as high as approximately 30/1 to 100/1 or more silica.

The loading amount of platinum which is a catalyst ingredient is preferably 0.01 to 5.0 g per liter of the catalyst. When the platinum amount is less than 0.01 g/liter, sufficient catalytic activity may not be obtained. On the other hand, when the platinum amount is more than 5.0 g/liter, the more increase in the loading amount does not improve catalytic activity the more, but unfavorably increases the production cost. Especially, the loading amount of platinum in the range from 0.1 to 3.0 g/liter is more preferable in respect of catalytic activity and production cost.

The loading amount of palladium is preferably 0.1 to 5.0 g per liter of the catalyst. When the palladium amount is less than 0.1 g/liter, sufficient catalytic activity may not be obtained. On the other hand, when the palladium amount exceeds 5.0 g/liter, the more increase in the loading amount of palladium does not improve catalytic activity the more, but increases the production cost. Especially, the loading amount of palladium in the range from 0.5 to 3.0 g/liter is more preferable in respect of catalytic activity and production cost.

The loading amount of rhodium is preferably 0.01 to 1.0 g/liter. When the rhodium amount is less than 0.01 g/liter, sufficient catalytic activity may not be obtained. On the other hand, when the rhodium amount is more than 1.0 g/liter, the more increase in the loading amount of rhodium does not improve catalytic activity the more, but unfavorably increases the production cost. Especially, the loading amount of rhodium in the range from 0.05 to 0.5 g/liter is more preferable in respect of catalytic activity and production cost.

According to the present invention, the potassium titanate included in the heat-resistant inorganic oxide layer is effective in the suppression of sulfate generation, and can largely improve the ability of removing harmful components such as hydrocarbons, carbon monoxide, and soluble organic fractions in a low temperature range.

Besides, in the catalyst for purifying exhaust gases according to the second aspect of the present invention, the heat-resistant inorganic oxide layer preferably comprises potassium titanate and at least one selected from the group consisting of silica, titania, and zirconia. The heat-resistant inorganic oxide layer including potassium titanate and at least one of silica, titania, and zirconia adsorbs little $SO_2$, and accordingly the amount of $SO_3$ produced by the reaction of $SO_2$ with a catalyst ingredient such as platinum is small.

As mentioned above, alumina is not preferable as a component of the heat-resistant inorganic oxide layer, because alumina adsorbs much $SO_2$ and the reaction of $SO_2$ with a catalyst ingredient such as platinum forms a large amount of $SO_3$.

The particle size of silica, titania and/or zirconia in the heat-resistant inorganic oxide layer according to the second aspect of the present invention is preferably 60 microns or less. When the particle size exceeds 60 microns, sufficient catalyst activity may not be obtained. Its mechanism is not cleared yet but supposed as follows:

The catalyst for purifying exhaust gases according to the second aspect of the present invention comprises a mixed layer comprising potassium titanate and at least one of silica, titania and zirconia, and at least one catalyst ingredient selected from the group consisting of platinum, palladium, and rhodium is loaded on the mixed layer. The mixed layer is formed of a uniform mixture of potassium titanate and at least one of silica, titania and zirconia. That is to say, potassium titanate is in contact with powder of at least one of silica, titania and zirconia, and/or at least one of silica, titania and zirconia is in the periphery of and in contact with potassium titanate. The catalyst ingredient loaded on the mixed layer thus constructed is loaded on both of the potassium titanate, and the at least one of silica, titania, and zirconia. An alkaline component $K_2O$ existing stably in potassium titanate changes the electronic state of the catalyst ingredient loaded on potassium titanate which hardly causes the oxidation reaction of $SO_2$. Further, since the at least one of silica, titania and zirconia is in contact with potassium titanate, the electronic state of most catalyst ingredients loaded on the at least one of silica, titania, and zirconia is changed by $K_2O$ in potassium titanate, and as a result, the oxidation reaction of $SO_2$ can be suppressed.

In comparison, in the case of a catalyst in which a catalyst ingredient such as platinum is loaded on at least one of silica, titania and zirconia which is not mixed with potassium titanate, both of hydrocarbons and $SO_2$ in the exhaust gases have an oxidation reaction on the catalyst ingredient such as platinum, and accordingly hydrocarbons are purified and at the same time sulfates are generated due to the oxidation reaction of $SO_2$. Therefore, when the amount of the at least one of silica, titania, and zirconia is more than 70 g per liter, its part which is not in contact with $K_2O$ of potassium titanate increases, and the generated amount of sulfates increases. Further, when the particle size of the at least one of Silica, titania, and zirconia is more than 60 microns, its part which is not in contact with potassium titanate increases, and a large amount of sulfates generate on the catalyst ingredient owing to the same effect as that of an increase in the amount of the at least one of silica, titania and zirconia.

As mentioned above, the catalyst for purifying exhaust gases according to the second aspect of the present invention is a catalyst in which a catalyst ingredient is loaded on a layer produced by uniformly mixing and contacting potassium titanate with at least one of silica, titania, and zirconia. Therefore, this catalyst can purify hydrocarbons in the exhaust gases even at low temperatures and at the same time produces little sulfates at elevated temperatures.

The catalyst for purifying exhaust gases according to the second aspect of the present invention includes substantially no alumina as a component of the heat-resistant inorganic oxide layer, except that the catalyst contains alumina as impurities.

One of the most preferable catalysts for purifying exhaust gases according to the second aspect of the present invention is a catalyst in which at least one catalyst ingredient of platinum, palladium and rhodium is loaded on a heat-resistant inorganic oxide layer including substantially no alumina and comprising potassium titanate and silica.

Now, the functions of the catalyst for purifying exhaust gases according to the present invention will be described.

Since alumina is not used for the catalyst carrier, the catalyst according to the present invention can oxidize at least hydrocarbons in exhaust gases at a high catalytic activity even at low temperatures, and at the same time can suppress $SO_2$ from being converted into sulfates.

Hydrocarbons in exhaust gases are oxidized into innocuous substance by the noble metal catalyst ingredient loaded on the catalyst carrier by the reaction:

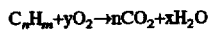

$$C_nH_m + yO_2 \rightarrow nCO_2 + xH_2O$$

In the meanwhile, sulfur dioxide in exhaust gases is oxidized by the reaction:

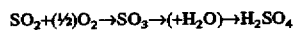

$$SO_2 + (\tfrac{1}{2})O_2 \rightarrow SO_3 \rightarrow (+H_2O) \rightarrow H_2SO_4$$

However, since the support of the present invention includes substantially no alumina, this oxidation reaction is relatively slow. As a result, sulfuric acid generation is suppressed.

As mentioned above, by loading a noble metal on potassium titanate of the present invention, conversions of hydrocarbons are mainly promoted, and generation of sulfuric acid due to oxidation of sulfur dioxide can be suppressed.

Accordingly, in the catalyst for purifying exhaust gases according to the second aspect of the present invention, because the heat-resistant inorganic oxide layer comprises potassium titanate and at least one selected from the group consisting of silica, titania, and zirconia, the catalyst can suppress sulfates from being emitted and at the same time can improve conversions of hydrocarbons and carbon monoxide in a low temperature range.

The catalyst for purifying exhaust gases according to the present invention has an advantage that it can oxidize at least hydrocarbons in exhaust gases at a high catalytic activity not only at elevated temperatures but also at low temperatures and at the same time can suppress sulfur dioxide from converted into sulfates.

Further, in purifying exhaust gases especially for gases from a diesel engine, the construction in which a heat-resistant inorganic oxide layer comprises potassium titanate and at least one selected from the group consisting of silica, titania, and zirconia attains improvements in the conversions of carbon monoxide and hydrocarbons at low temperatures and in the efficiency of removing particulates.

DETAILED DESCRIPTION OF THE PREFERRED EMBODIMENTS

Other objects and features of the invention will become apparent to those skilled in the art as the disclosure is made in the following description of preferred embodiments of the invention. In Examples 1 and 2 according to the present invention and Comparative Examples 1 to 4, the compositions of catalyst carriers which substantially exhibited catalytic activity and noble metals loaded on the catalyst carriers, and the compositions of catalyst carriers, noble metals, and binders were prepared and examined about their catalytic activity. Therefore, when the catalysts of Examples 1 and 2 according to the present invention are used, for example, as catalytic apparatus for purifying exhaust gases emitted from automotive internal combustion engines, it is required to apply each of the compositions of Examples 1 and 2 to a coating layer on the surface of a substrate such as a honeycomb support, or to form each of the compositions of Examples 1 and 2 in pellets having a predetermined particle diameter. It must be noted that in Examples 1 and 2 according to the present invention, only the compositions of catalyst carriers and noble metals loaded on the catalyst carriers, and the compositions of catalyst carriers, noble metals, and binders were examined about their catalytic activity.

Examples 3 to 8 are examples of catalysts including honeycomb supports used for purifying exhaust gases from diesel engines.

EXAMPLE 1

Employed was potassium titanate produced by OTSUKA CHEMICAL CO., LTD. in Japan and having the chemical formula $K_2O \cdot nTiO_2$ wherein n is 4, 6 and 8.

100 ml of acetone was added to 20 g of each potassium titanate, and each mixture was pulverized by a planetary ball mill and filtered. The powder having diameters of not more than 100 mesh was used as a catalyst carrier.

Platinum, which is a platinum group element, was loaded as a catalyst ingredient on each potassium titanate catalyst carrier. Platinum employed was a platinum dinitroso nitrate solution (Pt-P salt) manufactured by TANAKA KIKINZOKAI CO., LTD. in Japan. The loading amount of platinum was 0.1 to 10 g based on 100 g of the potassium titanate catalyst carrier. The loading of platinum was achieved by the following method: A dilute solution of a predetermined amount of Pt-P salt in 100 ml of water was added to 20 g of each potassium titanate catalyst carrier. While stirred at temperatures from 120° C. to 150° C., the mixture was evaporated to dryness. Then, the resultant was further dried at 110° C. for 15 hours. After air calcined at 350° C. for three hours, the resultant was pulverized and filtered to obtain granules having diameters of 6 to 10 mesh. Thus the catalysts of the present invention were prepared.

Catalysts of Sample Nos. 1 to 12 were prepared by the above method by changing the titanium amount n of potassium titanate to 8, 6, and 4, and varying the loading amount of platinum.

The performance of these catalysts was evaluated by placing 7 cc of each of these granular catalysts at a conventional flow system with a tubular fixed bed reactor. A model exhaust gas employed included propylene ($C_3H_6$) as a hydrocarbon in an amount of 600 ppm in terms of carbon, 10% of oxygen, 1000 ppm of carbon monoxide, 5% of carbon dioxide, 25 ppm of sulfur dioxide, 10% of water, and the balance of nitrogen gas. By changing the inlet gas temperatures from 500° C. to 150° C., the temperature at which 50% of propylene was converted was measured, and $SO_2$ conversion (%) at a model gas temperature of 400° C. was calculated by the following formula:

($SO_2$ concentration in the outlet gas / $SO_2$ concentration in the inlet gas)×100 (%)

The results are shown in Table 1.

TABLE 1

| SAMPLE No. | n in $K_2O$ $nTiO_2$ | Pt amount (g) per 100 g of $K_2O$ $nTiO_2$ | CATALYST PERFORMANCE 50% $C_3H_6$ CONVERSION TEMP. (°C.) | $SO_2$ CONVERSION (%) at 400° C. |
|---|---|---|---|---|
| 1 | 8 | 2 | 220 | 24 |
| 2 | 8 | 6 | 232 | 18 |
| 3 | 8 | 8 | 235 | 18 |
| 4 | 8 | 10 | 240 | 17 |
| 5 | 8 | 2.5 | 216 | 26 |

TABLE 1-continued

| SAMPLE No. | n in $K_2O$ $nTiO_2$ | Pt amount (g) per 100 g of $K_2O$ $nTiO_2$ | CATALYST PERFORMANCE 50% $C_3H_6$ CONVERSION TEMP. (°C.) | $SO_2$ CONVERSION (%) at 400° C. |
|---|---|---|---|---|
| 6 | 8 | 0.2 | 245 | 10 |
| 7 | 6 | 4 | 228 | 22 |
| 8 | 6 | 0.5 | 240 | 10 |
| 9 | 6 | 2 | 222 | 23 |
| 10 | 4 | 2 | 218 | 12 |
| 11 | 4 | 6 | 241 | 10 |
| 12 | 4 | 8 | 243 | 10 |

As apparent from Table 1, Sample Nos. 1 to 12 had 50% hydrocarbon conversion temperatures in the range from 216° C. to 245° C., and not more than 26% conversions of sulfur dioxide at 400° C. Therefore, the catalysts of Example 1 of the present invention could suppress the conversion of $SO_2$ without degrading the catalyst performance.

COMPARATIVE EXAMPLE 1

A catalyst was prepared by employing potassium titanate having the chemical formula $K_2O \cdot nTiO_2$ wherein n was 2 and by loading platinum on the potassium titanate catalyst carrier in an amount of 2g based on 100 g of the potassium titanate catalyst carrier by the same method as in Example 1.

The catalyst performance was evaluated by the same method as in Example 1. The results are shown in the line of Sample No.101 in Table 2. When Sample No.101 was compared with Sample No.1 of Example 1 having the same platinum amount, Sample No.101 had a higher hydrocarbon conversion temperature by approximately 60° C. and a higher sulfur dioxide conversion at 400° C. by approximately 14% than Sample No.1.

COMPARATIVE EXAMPLE 2

A catalyst was produced by employing $TiO_2$ including no $K_2O$ for a catalyst carrier and loading platinum on the titania catalyst carrier in an amount of 2 g based on 100 g of the titania catalyst carrier. The performance of this catalyst was also evaluated by the same method as in Example 1. The results are shown in the line of Sample No.102 in Table 2. Although Sample No.102 was capable of converting hydrocarbons, Sample No.102 exhibited 85% conversion of sulfur dioxide at 400° C. because of the lack of $K_2O$, and accordingly sulfuric acid was liable to be formed.

COMPARATIVE EXAMPLE 3

$K_2O$ was loaded on $TiO_2$ in amounts of 0.25 to 0.5 mol based on 1 mol of $TiO_2$ by using a $KNO_3$ aqueous solution. Then platinum was loaded on each of the catalyst carriers in an amount of 2 g based on 100 g in total of $TiO_2$ and $K_2O$, thereby preparing catalysts of Sample Nos.103 to 107. The performance of these comparative catalysts was evaluated in the same way as in Example 1.

The results are shown in the lines of Sample Nos. 103 to 107 in Table 2. Some of Sample Nos.103 to 107 had 50% hydrocarbon conversion temperatures of more than 300° C., and higher conversions to sulfuric acid at 400° C. than Sample Nos. 1 to 12 of Example 1 of the present invention.

TABLE 2

| SAMPLE No. | m:n in $mK_2O$ $nTiO_2$ | Pt amount (g) per 100 g of $K_2O$ $nTiO_2$ | CATALYST PERFORMANCE 50% $C_3H_6$ CONVERSION TEMP. (°C.) | $SO_2$ CONVERSION (%) at 400° C. |
|---|---|---|---|---|
| 101 | 1:2 | 2 | 286 | 38 |
| 102 | 1:0 | 2 | 231 | 85 |
| 103 | 0.25:1 | 2 | 285 | 35 |
| 104 | 0.3:1 | 2 | 295 | 35 |
| 105 | 0.4:1 | 2 | 310 | 30 |
| 106 | 0.5:1 | 2 | 310 | 30 |
| 107 | 0.45:1 | 2 | 305 | 30 |

Therefore, it is apparent that these comparative catalysts in which $K_2O$ was simply loaded on $TiO_2$ had higher 50% hydrocarbon conversion temperatures and higher conversions to sulfuric acid at 400° C. than the catalysts of Example 1 of the present invention. That is, it is clear that these comparative catalysts had insufficient catalytic performance.

EXAMPLE 2

Silica ($SiO_2$) sol, titania ($TiO_2$) sol or zirconia ($ZrO_2$) sol each manufactured by NISSAN CHEMICAL CO., LTD. in Japan was added as a binder in solid amounts of 1 to 10 parts by weight, as shown in Table 3, to 100 parts by weight of potassium titanate ($K_2O \cdot 8TiO_2$) manufactured by OTSUKA CHEMICAL CO., LTD. in Japan. After stirred vigorously, each mixture was calcined at 500° C. Next, platinum was loaded on each calcined body in an amount of 2 g based on 100 parts by weight of potassium titanate in the same way as in Example 1. Then, each catalyst ingredient loaded calcined body was pulverized and filtered to obtain granules having diameters of 6 to 10 mesh. Thus, 8 kinds of catalysts, Sample Nos.13 to 20 were produced.

The performance of these catalysts was evaluated by the same method as in Example 1. The results are also shown in Table 3.

TABLE 3

| SAMPLE No. | INORGANIC BINDER | CATALYST PERFORMANCE 50% $C_3H_6$ CONVERSION TEMP. (°C.) | $SO_2$ CONVERSION % at 400° C. |
|---|---|---|---|
| 13 | $SiO_2$, 1 part | 223 | 25 |
| 14 | $SiO_2$, 5 parts | 225 | 25 |
| 15 | $SiO_2$, 10 parts | 225 | 28 |
| 16 | $TiO_2$, 1 part | 222 | 26 |
| 17 | $TiO_2$, 5 parts | 228 | 26 |
| 18 | $TiO_2$, 10 parts | 226 | 24 |
| 19 | $ZrO_2$, 1 part | 227 | 24 |
| 20 | $ZrO_2$, 10 parts | 226 | 26 |

As apparent from Table 3, Sample Nos.13 to 20 had hydrocarbon conversion temperatures in the range from 222° C. to 228° C., and 24 to 28% conversions of sulfur dioxide at 400° C. Consequently, the catalysts of Example 2 could suppress $SO_2$ conversion without degrading catalytic performance.

COMPARATIVE EXAMPLE 4

Catalysts of Sample Nos. 108 to 110 were prepared in the same way as in Example 2, except that alumina ($Al_2O_3$) sol manufactured by NISSAN CHEMICAL CO., LTD. in Japan was added as a binder in solid amounts of 1 to 10 parts by weight, as shown in Table 4, based on 100 parts by weight of potassium titanate instead of the binders used in Example 2.

TABLE 4

| SAMPLE No. | INORGANIC BINDER | CATALYST PERFORMANCE | |
|---|---|---|---|
| | | 50% $C_3H_6$ CONVERSION TEMP. (°C.) | $SO_2$ CONVERSION % at 400° C. |
| 108 | $Al_2O_3$, 1 part | 225 | 48 |
| 109 | $Al_2O_3$, 5 parts | 223 | 56 |
| 110 | $Al_2O_3$, 10 parts | 230 | 82 |

The catalyst performance of Sample Nos.108 to 110 was evaluated in the same way as in Example 1. The results are shown in Table 4.

As seen from Table 4, Sample Nos. 108, 109, and 110 had 50% hydrocarbon conversion temperatures in the range from 223° C. to 230° C. That is, Sample Nos.108 to 110 exhibited favorable catalyst performance. However, Sample Nos. 108 to 110 exhibited as extremely high conversions of sulfur dioxide at 400° C. as 48 to 82%. That is, Sample Nos. 108 to 110 could not suppress $SO_2$ conversion. This is not preferable because when the conversion of $SO_2$ can not be suppressed, a large amount of harmful sulfates are formed.

EXAMPLE 3

A monolith support formed of cordierite and having 400 cells/inch$^2$, a diameter of 80 mm, and a length of 95 mm was coated with slurry comprising 40 g of silica powder of 10 microns in average particle diameter, 40 g of potassium titanate of 0.5 micron in average minor axis and 15 microns in average major axis, silica sol including 20 g of solid silica, and 100 g of deionized water. Then the coated monolith was dried, and calcined at 500° C. for one hour, thereby forming a heat-resistant inorganic oxide layer comprising silica and potassium titanate on the monolith support. This heat-resistant inorganic oxide layer included 60 g of silica and 40 g of potassium titanate per liter of the catalyst.

Then the resultant support was immersed in an aqueous solution of chloroplatinic acid, thereby loading 1.0 g of platinum per liter of the catalyst. Thus, the catalyst of Sample No.51 shown in Table 5 was obtained.

EXAMPLE 4

A monolith support formed of cordierite and having 400 cells/inch$^2$, a diameter of 80 mm, and a length of 95 mm was coated with slurry comprising 40 g of titania powder of 0.7 micron in average particle diameter, 40 g of potassium titanate of 0.5 micron in average minor axis and 15 microns in average major axis, titania sol including 20 g of solid titania, and 100 g of deionized water. Then the coated monolith was dried, and calcined at 500° C. for one hour, thereby forming a heat-resistant inorganic oxide layer including titania and potassium titanate on the monolith support. The heat-resistant inorganic oxide layer included 60 g of titania and 40 g of potassium titanate per liter of the catalyst.

Next, the coated support was further immersed in a palladium nitrate solution, thereby loading 1.0 g of palladium per liter of the catalyst. Thus, the catalyst of Sample No.52 shown in Table 5 was obtained. The composition of the catalyst is shown in Table 5.

EXAMPLE 5

A monolith formed of cordierite and having 400 cells/inch$^2$, a diameter of 80 mm, and a length of 95 mm was coated with slurry comprising 80 g of zirconia powder of 0.5 micron in average particle diameter, 50 g of potassium titanate powder of 0.5 micron in average minor axis and 15 microns in average major axis, zirconia sol including 20 g of solid zirconia, and 150 g of deionized water. Then, the coated monolith support was dried and calcined at 500° C. for one hour, thereby forming a heat-resistant inorganic oxide layer including zirconia and potassium titanate on the monolith support. This heat-resistant inorganic oxide layer included 100 g of zirconia and 50 g of potassium titanate per liter of the catalyst.

Next, the coated support was immersed in a rhodium nitrate solution, thereby loading 1.0 g of rhodium per liter of the catalyst. Thus, the catalyst of Sample No.53 shown in Table 5 was obtained.

EXAMPLE 6

The catalyst of Sample No.51 produced in Example 3 was further immersed in a rhodium nitrate solution, thereby loading 0.2 g of rhodium per liter of the catalyst. Thus, the catalyst of Sample No.54 shown in Table 5 was obtained.

TABLE 5

| | CATALYST SAMPLE No. | HEAT-RESISTANT INORGANIC OXIDE LAYER | CATALYST METAL (g/L) | | | CONVERSION (%) at 250° C. | | CONVERSION (%) of PARTICULATES |
|---|---|---|---|---|---|---|---|---|
| | | | Pt | Pd | Rh | HC | CO | at 350° C. |
| Ex. 3 | 51 | $SiO_2,K_2O.8TiO_2$ | 1.0 | — | — | 92 | 94 | 29 |
| Ex. 4 | 52 | $TiO_2,K_2O.8TiO_2$ | — | 1.0 | — | 75 | 81 | 25 |
| Ex. 5 | 53 | $ZrO_2,K_2O.8TiO_2$ | — | — | 1.0 | 45 | 44 | 20 |
| Ex. 6 | 54 | $SiO_2,K_2O.8TiO_2$ | 1.0 | — | 0.2 | 82 | 85 | 27 |
| Ex. 7 | 55 | $TiO_2,K_2O.8TiO_2$ | — | 1.0 | 0.2 | 71 | 80 | 24 |
| Ex. 8 | 56 | $SiO_2,K_2O.8TiO_2$ | 0.5 | 0.5 | 0.2 | 85 | 92 | 26 |
| Com. Ex. 5 | A | $Al_2O_3$ | 1.0 | — | — | 83 | 94 | −43 |
| Com. Ex. 6 | B | $SiO_2$ | 1.0 | — | — | 80 | 92 | −37 |
| Com. Ex. 7 | C | $TiO_2$ | — | 1.0 | — | 81 | 91 | −50 |
| Com. Ex. 8 | D | $ZrO_2$ | — | — | 1.0 | 35 | 30 | 2 |
| Com. Ex. 9 | E | $Al_2O_3$ | 1.0 | — | 0.2 | 72 | 71 | −23 |
| Com. Ex. 10 | F | $SiO_2$ | 1.0 | — | 0.2 | 71 | 79 | −22 |
| Com. Ex. 11 | G | $TiO_2$ | — | 1.0 | 0.2 | 69 | 71 | −1 |
| Com. Ex. 12 | H | $Al_2O_3$ | 0.5 | 0.5 | 0.2 | 69 | 71 | −5 |
| Com. Ex. 13 | I | $SiO_2$ | 0.5 | 0.5 | 0.2 | 91 | 87 | −10 |

EXAMPLE 7

The catalyst of Sample No.52 produced in Example 4 was further immersed in a rhodium nitrate solution, thereby loading 0.2 g of rhodium per liter of the catalyst. Thus, the catalyst of Sample No.55 shown in Table 5 was obtained.

EXAMPLE 8

The heat-resistant inorganic oxide layer formed on the monolith support in Example 3 was immersed first in a chloroplatinic acid aqueous solution, second in a palladium nitrate solution, and then in a rhodium nitrate solution, thereby loading 0.5 g of platinum, 0.5 g of palladium, and 0.2 g of rhodium per liter of the catalyst. Thus, the catalyst of Sample No.56 shown in Table 5 was obtained.

COMPARATIVE EXAMPLE 5

A monolith support formed of cordierite and having 400 cell/inch$^2$, a diameter of 80 mm, and a length of 95 mm was coated with slurry comprising 100 g of activated alumina of 5 microns in average particle diameter, 5 g of alumina hydrate, and 150 g of deionized water. Then, the coated support was dried and calcined at 500° C. for one hour, thereby forming a heat-resistant inorganic oxide layer comprising activated alumina on the monolith support.

Next, the monolith support having this heat-resistant inorganic oxide layer was immersed in a chloroplatinic acid aqueous solution, thereby loading 1.0 g of platinum per liter of the catalyst. Thus, the catalyst of Sample A shown in Table 5 was obtained.

COMPARATIVE EXAMPLE 6

A monolith support formed of cordierite and having 400 cells/inch$^2$, a diameter of 80 mm, and a length of 95 mm was coated with slurry comprising 100 g of silica powder of 5 microns in average particle diameter, silica sol including 50 g of solid silica, and 100 g of deionized water. Then the coated support was dried and calcined at 500° C. for one hour, thereby forming a heat-resistant inorganic oxide layer comprising silica on the monolith support.

Next, the support having this heat-resistant inorganic oxide layer thereon was immersed in a chloroplatinic acid aqueous solution, thereby loading 1.0 g of platinum per liter of the catalyst. Thus, the catalyst of Sample B shown in Table 5 was obtained.

COMPARATIVE EXAMPLE 7

A monolith support formed of cordierite and having 400 cells/inch$^2$, a diameter of 80 mm, and a length of 95 mm was coated with slurry comprising 100 g of titania of 0.7 micron in average particle diameter, titania sol including 20 g of solid titania, and 200 g of deionized water. Then the coated support was dried and calcined at 500° C. for one hour, thereby forming a heat-resistant inorganic oxide layer comprising titania on the monolith support.

Next, the support having the heat-resistant inorganic oxide layer thereon was immersed in a palladium nitrate aqueous solution, thereby loading 1.0 g of palladium per liter of the catalyst. Thus, the catalyst of Sample C shown in Table 5 was obtained.

COMPARATIVE EXAMPLE 8

A monolith support formed of cordierite and having 400 cells/inch$^2$, a diameter of 80 mm, and a length of 95 mm was coated with slurry comprising 100 g of zirconia powder of 0.7 micron in average particle diameter, zirconia sol including 20 g of solid zirconia, and 200 g of deionized water. Then the coated support was dried and calcined at 500° C. for one hour, thereby forming a heat-resistant inorganic oxide layer comprising zirconia on the monolith support.

Then the support having the heat-resistant inorganic oxide layer thereon was immersed in a rhodium nitrate aqueous solution, thereby loading 1.0 g of rhodium per liter of the catalyst. Thus, the catalyst of Sample D shown in Table 5 was obtained.

COMPARATIVE EXAMPLE 9

The catalyst of Sample A produced in Comparative Example 5 was further immersed in a rhodium nitrate solution, thereby loading 0.2 g of rhodium per liter of the catalyst. Thus, the catalyst of Sample E shown in Table 5 was obtained.

COMPARATIVE EXAMPLE 10

The catalyst of Sample B produced in Comparative Example 6 was further immersed in a rhodium nitrate solution, thereby loading 0.2 g of rhodium per liter of the catalyst. Thus, the catalyst of Sample F shown in Table 5 was obtained.

COMPARATIVE EXAMPLE 11

The catalyst of Sample C produced in Comparative Example 7 was further immersed in a rhodium nitrate solution, thereby loading 0.2 g of rhodium per liter of the catalyst. Thus, the catalyst of Sample G shown in Table 5 was obtained.

COMPARATIVE EXAMPLE 12

The loading amount of platinum in the catalyst of Sample A produced in Comparative Example 5 was reduced in half, and the catalyst was further immersed in a palladium nitrate solution and in a rhodium nitrate solution, thereby loading 0.5 g of platinum, 0.5 g of palladium, and 0.2 g of rhodium per liter of the catalyst. Thus, the catalyst of Sample H shown in Table 5 was obtained.

COMPARATIVE EXAMPLE 13

The loading amount of platinum in the catalyst of Sample B produced in Comparative Example 6 was reduced in half, and the catalyst was further immersed in a palladium nitrate solution and in a rhodium nitrate solution, thereby loading 0.5 g of platinum, 0.5 g of palladium, and 0.2 g of rhodium per liter of the catalyst. Thus, the catalyst of Sample I shown in Table 5 was obtained.

EVALUATION

Each of the catalysts thus produced was installed in the exhaust line of a direct injection diesel engine having a displacement volume of 3.6 liters. First, the engine was driven at a rated full throttle for 500 hours. Then, when the engine was driven at 2500 rpm and at a torque of 8 KW, the inlet gas to the catalyst bed and the outlet gas from the catalyst bed were measured about hydrocarbons, and carbon monoxide, and the conversions (%) were calculated by using following Formula 1. The inlet gas temperature was 250° C.

FORMULA 1 conversion (%)=
{inlet exhaust gas component concentration−outlet exhaust gas component concentration}/inlet exhaust gas component concentration×100

Next, the engine torque was changed to 25 KW and the inlet gas temperature to the catalyst bed was controlled to 350° C., and particulates in an inlet gas to the catalyst bed and an outlet gas from the catalyst bed were analyzed and the conversion (%) was calculated by using the Formula 1. The particulates were examined by first collecting the particulates on a filter by using a dilution tunnel, and second determining the composition of particulates on the filter by a Soxhlet extractor.

The results are shown in Table 5.

As apparent from Table 5, Sample Nos.51 to 56 according to Examples 3 to 8 of the present invention exhibited high conversions of hydrocarbons and carbon monoxide at 250° C., and excellent conversions of particulates at 350° C. On the other hand, Samples A to I according to Comparative Examples 5 to 13 including no potassium titanate but loaded with the same amounts of catalyst ingredients as Sample Nos.51 to 56 exhibited as high conversions of hydrocarbons and carbon monoxide at 250° C. as Sample Nos.51 to 56 according to Examples 3 to 8 of the present invention, but showed conversions of particulates in minus values. This shows that $SO_2$ was oxidized to $SO_3$ by oxygen gas contained in the exhaust gases from the diesel engine. This is because $SO_2$ was not measured as particulates, but $SO_3$ was measured as particulates. Especially in the catalyst using platinum as a catalyst ingredient, the oxidation reaction was promoted and accordingly the minus values of the conversions of the particulates were large.

Further, as demonstrated by Table 5, the catalysts having the heat-resistant inorganic oxide layer including $SiO_2$ had higher ability of purifying hydrocarbons and carbon monoxide and higher conversions of particulates than other catalysts.

As described in the above, the catalysts for purifying exhaust gases according to Examples 3 to 8 of the present invention could improve conversions of particulates by providing (40 g/liter of) potassium titanate to the heat-resistant inorganic oxide layer. Owing to this, these catalysts could suppress particulates from being emitted.

Obviously, many modifications and variations of the present invention are possible in the light of the above teachings. It is therefore to be understood that within the scope of the appended claims, the invention may be practiced otherwise than as specifically described.

What is claimed is:

1. A catalyst for purifying exhaust gases comprising:
   a catalyst carrier consisting essentially of potassium titanate expressed by the chemical formula $K_2O \cdot nTiO_2$ wherein n is an integer selected from 4 to 8; and
   a noble metal loaded on said catalyst carrier.

2. A catalyst for purifying exhaust gases according to claim 1, wherein said noble metal is at least one ingredient selected from the group consisting of platinum, palladium and rhodium.

3. A catalyst for purifying exhaust gases according to claim 1, wherein the loading amount of said noble metal is 0.2 to 10 g based on 100 g of said potassium titanate.

4. A catalyst for purifying exhaust gases according to claim 1, further comprising at least one binder selected from the group consisting of silica ($SiO_2$) sol, titania ($TiO_2$) sol, and zirconia ($ZrO_2$) sol.

5. A catalyst for purifying exhaust gases comprising:
   a catalyst support; and
   a heat-resistant inorganic oxide layer formed on said catalyst support, said heat-resistant inorganic oxide layer consisting essentially of potassium titanate expressed by the chemical formula $K_2O \cdot nTiO_2$ wherein n is an integer selected from 4 to 8 and at least one member selected from the group consisting of silica, titania and zirconia, and loading a noble metal thereon.

6. A catalyst for purifying exhaust gases according to claim 5, wherein said noble metal is at least one ingredient selected from the group consisting of platinum, palladium and rhodium.

7. A catalyst for purifying exhaust gases according to claim 5, wherein the amount of said potassium titanate is in the range from 20 to 60 g per liter of said catalyst.

8. A catalyst for purifying exhaust gases according to claim 5, wherein said heat-resistant inorganic-oxide layer comprises said potassium titanate and silica.

* * * * *